US012010739B2

(12) United States Patent
Akl et al.

(10) Patent No.: US 12,010,739 B2
(45) Date of Patent: Jun. 11, 2024

(54) TECHNIQUES FOR INTER-GNB MIGRATION OF DISTRIBUTED UNIT

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/492,296

(22) Filed: Oct. 1, 2021

(65) Prior Publication Data

US 2022/0117007 A1 Apr. 14, 2022

Related U.S. Application Data

(60) Provisional application No. 63/090,052, filed on Oct. 9, 2020.

(51) Int. Cl.
*H04W 76/10* (2018.01)
*H04W 24/02* (2009.01)
(Continued)

(52) U.S. Cl.
CPC .......... *H04W 76/10* (2018.02); *H04W 24/02* (2013.01); *H04W 88/14* (2013.01); *H04W 92/24* (2013.01)

(58) Field of Classification Search
None
See application file for complete search history.

(56) References Cited

U.S. PATENT DOCUMENTS

| 11,700,624 B2 * | 7/2023 | Luo ...................... H04W 72/53 370/329 |
| 2021/0345197 A1 * | 11/2021 | Akl ................... H04W 36/0077 |

(Continued)

OTHER PUBLICATIONS

International Search Report and Written Opinion—PCT/US2021/053375—ISA/EPO—Mar. 28, 2022.
(Continued)

*Primary Examiner* — Christopher T Wyllie
(74) *Attorney, Agent, or Firm* — Arent Fox LLP /Qualcomm Incorporated

(57) ABSTRACT

Present disclosure provides techniques for migrating integrated access and backhaul (IAB) nodes from the source centralized unit (CU) to a target IAB-donor-CU of a base station. Features of the present disclosure achieve such migration by configuring the IAB distributed unit (IAB-DU) to establish F1-connection (F1-C) with the target IAB-donor-CU via the source path before the user equipment (UE) context transfer occurs. To this end, the source IAB-donor-CU may initiate an F1-C establishment between IAB-node DU and target IAB-donor-CU. The source IAB-donor-CU may do so by acting or presenting as an IAB-node-DU proxy to the target IAB-donor-CU. At the same time, the source IAB-donor-CU may act or present as a target-IAB-donor-CU proxy to the IAB-node-DU. Thus, in some cases, the source IAB-donor-CU may present as both the IAB-node-DU proxy (to the target IAB-donor-CU) and as a target-IAB-donor-CU proxy (to the IAB-node-DU).

27 Claims, 6 Drawing Sheets

(51) Int. Cl.
*H04W 88/14* (2009.01)
*H04W 92/24* (2009.01)

(56) References Cited

U.S. PATENT DOCUMENTS

| | | | | |
|---|---|---|---|---|
| 2022/0022214 | A1* | 1/2022 | Akl | H04B 7/15542 |
| 2022/0117007 | A1* | 4/2022 | Akl | H04W 36/08 |
| 2022/0141894 | A1* | 5/2022 | Akl | H04W 40/22 |
| | | | | 370/329 |
| 2022/0361067 | A1* | 11/2022 | Koskinen | H04B 7/15528 |
| 2022/0361072 | A1* | 11/2022 | Zhu | H04W 40/36 |
| 2023/0232294 | A1* | 7/2023 | Teyeb | H04W 36/023 |
| | | | | 370/331 |
| 2023/0292204 | A1* | 9/2023 | Mildh | H04W 36/18 |

OTHER PUBLICATIONS

Partial International Search Report—PCT/US2021/053375—ISA/EPO—Feb. 4, 2022.
Qualcomm Incorporated: "IAB Baseline for 38.401", 3GPP Draft, Draft R3-19XXXX, 3GPP TSG-RAN WG3 Meeting #103, IAB Baseline for 38401, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 15, 2019-Mar. 1, 2019, Feb. 6, 2019 (Feb. 6, 2019), XP051591971, 16 Pages, Retrieved from the Internet: URL: http://www.3gpp.org/ftp/Email%5FDiscussions/RAN2/[RAN2%23105]/[IAB%20WI%20drafts] [retrieved on Feb. 6, 2018].
Qualcomm Incorporated: "IAB Topology Adaptation For Architecture Group 1", 3GPP Draft, R3-183731, 3GPP TSG-RAN WG3 Meeting #AH1807, IAB Topology Adaption for Arch 1A, 3rd Generation Partnership Project (3GPP), Mobile Competence Centre, 650, Route Des Lucioles, F-06921 Sophia-Antipolis Cedex, France, vol. RAN WG3, No. Montreal, Canada, Jul. 2, 2018-Jul. 6, 2018, Jun. 25, 2018 (Jun. 25, 2018), XP051529617, 8 Pages.
Qualcomm Incorporated: "Inter-Donor IAB-Node Migration", 3GPP Draft, 3GPP TSG-RAN WG3 Meeting #109-e, R3-204795, 3rd Generation Partnership Project (3GPP), Mobile Competence Centre, 650, Route Des Lucioles, F-06921 Sophia-Antipolis Cedex, France, vol. RAN WG3, No. E-meeting, Aug. 17, 2020-Aug. 28, 2020, Aug. 6, 2020 (Aug. 6, 2020), XP051911260, pp. 1-5, Retrieved from the Internet: URL: https://ftp.3gpp.org/tsg_ran/WG3_lu/TSGR3_109-e/Docs/R3-204795.zip. R3-204795 Inter-donor IAB-node migration. docx.
Qualcomm (Moderator) : "Summary of Offline Discussion on IAB Service Interruption", 3GPP Draft, R3-205467, 3rd Generation Partnership Project (3GPP), Mobile Competence Centre, 650, Route Des Lucioles, F-06921 Sophia- Antipolis Cedex, France, vol. RAN WG3, No. Online, Aug. 17, 2020-Aug. 27, 2020, Sep. 2, 2020 (Sep. 2, 2020), XP051928193, 20 Pages, Retrieved from the Internet: URL:https://ftp.3gpp.org/tsg_ran/WG3_lu/TSGR3_109-e/Docs/R3-205467 zip, R3-205467 CB07—IAB service interruption reduction_v3—summary Phase 1.doc.
RAN3 Chairman: "List of E-mail Discussions", 3GPP Draft, R3-205451, 3GPP TSG-RAN WG3 #109-e, 3rd Generation Partnership Project (3GPP), Mobile Competence Centre, 650, Route Des Lucioles, F-06921 Sophia-Antipolis Cedex, France, vol. RAN WG3, No. Online, Aug. 17, 2020-Aug. 28, 2020, Sep. 2, 2020 (Sep. 2, 2020), XP051928191, 25 Pages, Retrieved from the Internet: URL:https://ftp.3gpp.org/tsg_ran/WG3_lu/TSGR3_109-e/Docs/R3-205451.zip R3-205451.doc [retrieved on Sep. 2, 2020] p. 6, line 11-line 24.
Qualcomm Incorporated: "IAB Baseline for 38.401", 3GPP Draft, Draft R3-19XXXX, 3GPP TSG-RAN WG3 Meeting #103, IAB Baseline for 38401, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 15, 2019-Mar. 1, 2019, Feb. 6, 2019 (Feb. 6, 2019), XP051591971, 16 Pages, Retrieved from the Internet: URL: http://www.3gpp.org/ftp/Email%5FDiscussions/RAN2/[RAN2%23105]/[IAB%20W1%20drafts] [retrieved on Feb. 6, 2019].
Qualcomm Incorporated: "Inter-Donor IAB-Node Migration", 3GPP Draft, 3GPP TSG-RAN WG3 Meeting #109-e, R3-204795, 3rd Generation Partnership Project (3GPP), Mobile Competence Centre, 650, Route Des Lucioles, F-06921 Sophia-Antipolis Cedex, France, vol. RAN WG3, No. E-meeting, Aug. 17, 2020-Aug. 28, 2020, Aug. 6, 2020 (Aug. 6, 2020), XP051911260, pp. 1-5. Discussion; p. 1, paragraph 2-p. 4, p. 2, line 9-line 23 p. 3, Option 2b.
Qualcomm (Moderator) : "Summary of Offline Discussion on IAB Service Interruption", 3GPP Draft, R3-205467, 3rd Generation Partnership Project (3GPP), Mobile Competence Centre, 650, Route Des Lucioles, F-06921 Sophia-Antipolis Cedex, France, vol. RAN WG3, No. Online, Aug. 17, 2020-Aug. 27, 2020, Sep. 2, 2020 (Sep. 2, 2020), XP051928193, 20 Pages.

\* cited by examiner

TECHNIQUES FOR INTER-GNB MIGRATION OF DISTRIBUTED UNIT

CROSS-REFERENCE TO RELATED APPLICATION(S)

The present application claims benefit of U.S. Provisional Application No. 63/090,052 entitled "TECHNIQUES FOR INTER-GNB MIGRATION OF DISTRIBUTED UNIT" filed Oct. 9, 2020, which is assigned to the assignee hereof and hereby expressly incorporated by reference herein.

TECHNICAL FIELD

The present disclosure relates to wireless communication systems, and more particularly, to techniques for inter-gNB migration of a distributed units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for migrating integrated access and backhaul (IAB) nodes, and more particularly the IAB-mobile terminal (IAB-MT), IAB distributed units (IAB-DUs), and/or user equipments (UEs) connected to the IAB node, from the source centralized unit (CU) to a target IAB-donor-CU of a base station. Features of the present disclosure achieve such migration by configuring the IAB-DU to establish F1-connection (F1-C) with the target IAB-donor-CU via the source path before the UE context transfer occurs. To this end, the source IAB-donor-CU may initiate an F1-C establishment between IAB-node DU and target IAB-donor-CU. The source IAB-donor-CU may do so by acting or presenting as an IAB-node-DU proxy to the target IAB-donor-CU. At the same time, the source IAB-donor-CU may act or present as a target-IAB-donor-CU proxy to the IAB-node-DU. Thus, in some cases, the source IAB-donor-CU may present as both the IAB-node-DU proxy (to the target IAB-donor-CU) and as a target-IAB-donor-CU proxy (to the IAB-node-DU). By establishing F1-C with the target IAB-donor-CU via the source path, the IAB-node-DU may establish a new transport network layer association (TNLA) with the target IAB-donor-CU that it uses for its F1-C signalling.

In one example, a method for wireless communication is disclosed. The method may include establishing a first signaling connection between a source IAB-donor-CU with at least one IAB-DU. The method may also include establishing a second signaling connection between the source IAB-donor CU and a target IAB-donor CU. The method may also include configuring the source IAB-donor CU to function as a first proxy for the at least one IAB-DU in order to transmit state information associated with the at least one IAB-DU to the target IAB-donor CU. The method may include receiving, at the IAB-donor CU, a state update information from the target IAB-donor CU. The method may also include configuring the source IAB-donor CU to function as a second proxy for the target IAB-donor CU in transmitting the state update information to the at least one IAB-DU.

In another example, an apparatus for wireless communications. The apparatus may include a memory having instructions and a processor configured to execute the instructions to establish a first signaling connection between a source IAB-donor CU with at least one IAB-DU. The processor may further be configured to execute the instructions to establish a second signaling connection between the source IAB-donor CU and a target IAB-donor CU. The processor may further be configured to execute the instructions to configure the source IAB-donor CU to function as a first proxy for the at least one IAB-DU in order to transmit state information associated with the at least one IAB-DU to the target IAB-donor CU. The processor may further be configured to execute the instructions to receive, at the IAB-donor CU, a state update information from the target IAB-donor CU. The processor may further be configured to execute the instructions to configure the source IAB-donor CU to function as a second proxy for the target IAB-donor CU in transmitting the state update information to the at least one IAB-DU.

In some aspects, a non-transitory computer readable medium includes instructions stored therein that, when executed by a processor, cause the processor to perform the steps of establishing a first signaling connection between a source IAB-donor-CU with at least one IAB-DU. The processor may further perform the steps of establishing a second signaling connection between the source IAB-donor CU and a target IAB-donor CU. The processor may further perform the steps of configuring the source IAB-donor CU to function as a first proxy for the at least one IAB-DU in order to transmit state information associated with the at least one IAB-DU to the target IAB-donor CU. The processor may further perform the steps of receiving, at the IAB-donor CU, a state update information from the target IAB-donor CU. The processor may further perform the steps of configuring the source IAB-donor CU to function as a second proxy for the target IAB-donor CU in transmitting the state update information to the at least one IAB-DU.

In certain aspects, another apparatus for wireless communication is disclosed. The apparatus may include means for establishing a first signaling connection between a source IAB-donor-CU with at least one IAB-DU. The apparatus may further include means for establishing a second signaling connection between the source IAB-donor CU and a target IAB-donor CU. The apparatus may further include means for configuring the source IAB-donor CU to function as a first proxy for the at least one IAB-DU in order to transmit state information associated with the at least one IAB-DU to the target IAB-donor CU. The apparatus may further include means for receiving, at the IAB-donor CU, a state update information from the target IAB-donor CU. The apparatus may further include means for configuring the source IAB-donor CU to function as a second proxy for the target IAB-donor CU in transmitting the state update information to the at least one IAB-DU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
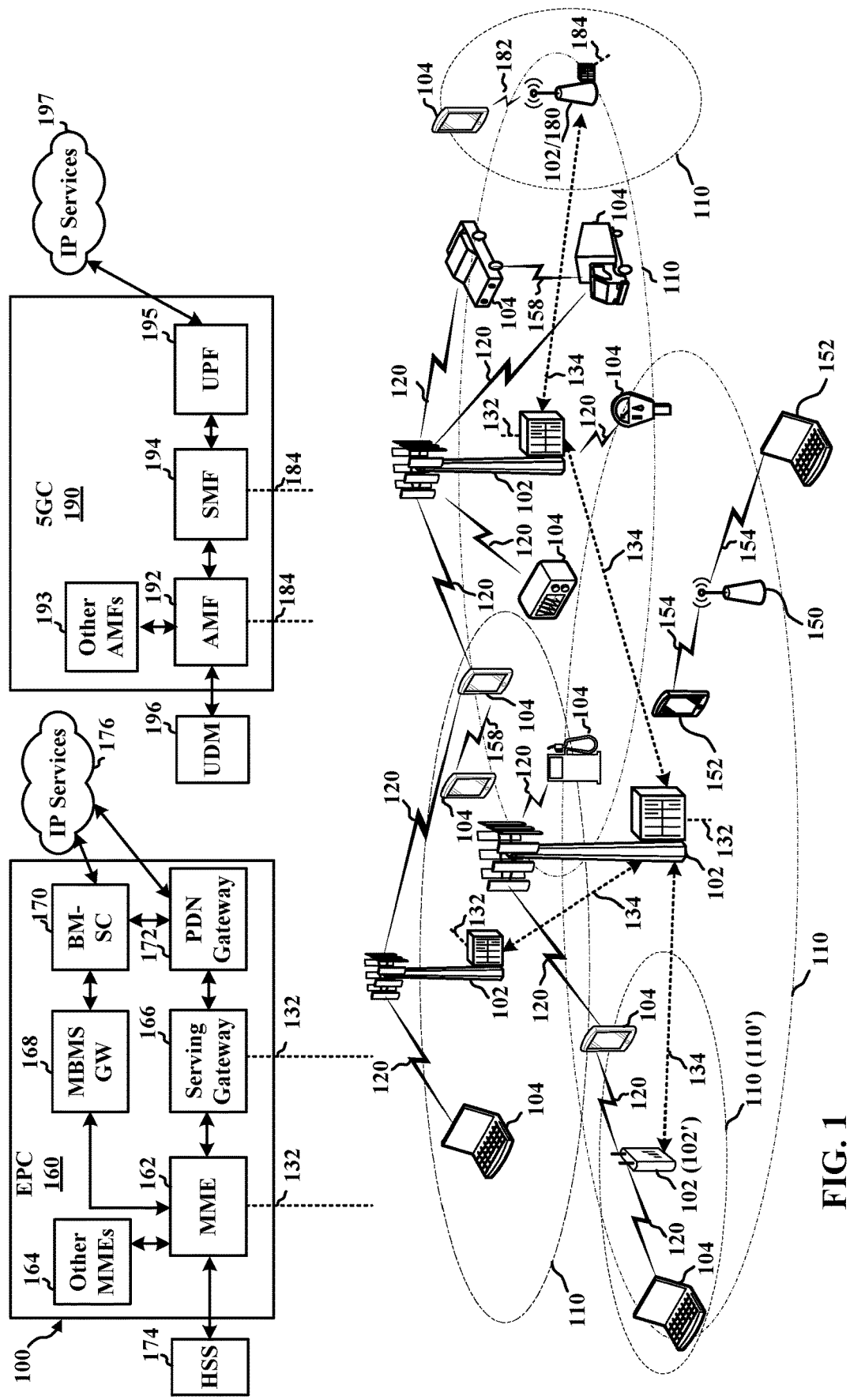
FIG. 1 is a schematic diagram of an example of a wireless communications system in accordance with aspects of the present disclosure.

One aspect of the 5G NR communications technology includes the use of high-frequency spectrum bands, such as those above 24 GHz, which may be referred to as millimeter wave (mmW) bands. The use of these bands enables extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station (BS) and the user equipment (UE), and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. The isotropic path loss and the propagation characteristics of the mmWave environment, however, demands a dense next generation node base station (gNBs) (i.e., base stations in NR technology) deployment to guarantee line-of-sight links at any given time and to decrease the outage probability. In such deployments, equipping each gNB with a wired backhaul link (e.g., fiber) may not be feasible due to the high expense involved. As such, network operators have considered using wireless backhaul as a more cost-effective alternative solution for high-density deployment scenarios.

Facilitating wireless backhaul communication may include utilizing integrated access and backhaul (IAB) nodes (which may include "relay nodes") that may have both a base station (gNB)-type and a user equipment (UE)-type functionality. The IAB nodes provide the wireless communications system flexibility such that only a fraction of gNBs may be equipped with a traditional wired backhaul capabilities (e.g., using cable or optical fiber), while the rest of the gNBs (or IAB nodes) may have direct or indirect (e.g., via relay nodes) wireless connections to the wired backhaul, e.g., possibly through multiple hops via one or more relay nodes.

Thus, the IAB nodes may include the gNB-type functionality that allows for transmission and reception of signals to and from child nodes (e.g., a UE or another IAB node) through an access link. Additionally, the IAB nodes may also include the UE-type functionality that allows for transmission and reception of signals to and from a parent node (e.g., a gNB or another IAB node) through backhaul links. By utilizing an IAB node, a common architecture, common waveforms, and common procedures may be shared for access links and backhaul links, thereby reducing the system complexity. For example, the JAB nodes may share the same wireless resources (e.g., via TDM or FDM) between the access links and backhaul links.

In JAB network architecture, one or more base stations may include a centralized unit (CU) and a distributed unit (DU), and may be referred to as donor base stations (e.g., or JAB donors). One or more DUs associated with a donor base station may be partially controlled by one or more CUs associated with the donor base station. A base station CU may be a component of a database, data center, core network, or network cloud. A network node associated with a radio access technology (RAT) may communicate with a donor base station CU via a backhaul link (e.g., wireline backhaul or wireless backhaul). The one or more donor base stations (e.g., JAB donors) may also be in communication with one or more additional base stations (e.g., JAB nodes or relay nodes) and user equipment (UEs). JAB nodes may support mobile terminal (MT) functionality controlled and scheduled by an JAB donor and/or parent JAB nodes relative to the MT supported JAB nodes, as well as DU operability relative to additional entities (e.g., JAB nodes, UEs, etc.) within the relay chain or configuration of the access network (e.g., downstream). For example, an JAB network architecture may include a chain of connected wireless devices (e.g., starting with a donor base station and ending with a user equipment (UE), with any number of IAB relay nodes in between) via link resources that support NR access and backhaul capabilities (e.g., a wireline backhaul or wireless backhaul).

In some aspects, a relay node may refer to an intermediary node in a relay (e.g., an IAB relay) chain. For example, a relay node may relay communications between a parent node (e.g., an IAB donor, or an IAB node upstream or higher on the relay chain) and a child node (e.g., an IAB node downstream or lower on the relay chain. In some cases, the relay node may refer to the DU or access node function (AN-F) of an intermediary IAB node. A child node may refer to an IAB-Node (e.g., the CU/MT of the IAB-Node), or a child node may refer to a UE that is the child of another IAB-Node (e.g., such as the relay node) or an IAB-donor (e.g., the DU/ANF of the IAB-Noce or IAB-Donor). A parent node in communication with the relay node may refer to an upstream IAB-Node or an IAB-donor (e.g., the DU/ANF of the IAB-Node or IAB-Donor). In some cases, a parent node may be referred to as a control node (e.g., a control node may refer to a parent node or a DU of a parent node in communication with an MT of a relay node or other intermediary IAB node).

Thus, as noted above, access nodes or base stations can be split into DUs and CU. The interface between DU and CU can be referred to as the F1 interface. Specifically, an F1-connection (F1-C) may be established between the IAB-donor CU and each of the IAB-donor DUs and IAB-node DUs. The F1-AP/SCTP connection may be used to exchange control plane (CP) messages. During the F1 setup procedure, a gNB-DU may send an F1 SETUP REQUEST message to the gNB-CU that includes a list of cells that are configured and ready to be activated. In turn, the gNB-CU may send an F1 SETUP RESPONSE message to the gNB-DU that optionally includes a list of cells to be activated. Each served cell on the gNB-DU may be identified by NR cell global identity (NR CGI) and/or NR physical cell ID (NR PCI) pair. In some aspects, F1AP services may be divided into non-UE associated services and UE-associated services In IAB network systems, when a mobile terminal (MT) of an IAB-node performs a handover from a source CU (e.g., CU-a) to a target CU (e.g., CU-b), the DUs associated with the IAB node should also migrate to the target CU (e.g., CU-b) and the IAB node may need to establish F1-C with the target CU. However, in order to perform such handover, the IAB-DU may require target path availability to the target CU. Similarly, the UEs connected to the IAB-node may need to perform handover to the target CU-b when the MT switches over source CU (e.g., CU-a) to a target CU (e.g., CU-b). However, in order to conduct such handover, the handover command delivery may require the source path availability. Thus, in current systems, attempting to migrate IAB-MT, IAB-DU-, and UE from the source CU to the target IAB-donor-CU may lead to deadlock scenario.

Aspects of the present disclosure provide techniques to overcome such deadlock. Specifically, in some aspects, the IAB-DU may establish F1-C with the target IAB-donor-CU via the source path before the UE 104 context transfer occurs. To this end, the source IAB-donor-CU may initiate an F1-C establishment between IAB-node DU and target IAB-donor-CU. The source IAB-donor-CU may do so by acting or presenting as an IAB-node-DU proxy to the target IAB-donor-CU. At the same time, the source IAB-donor-CU may act or present as a target-IAB-donor-CU proxy to the IAB-node-DU. Thus, in some cases, the source IAB-donor-CU may present as both the IAB-node-DU proxy (to the target IAB-donor-CU) and as a target-IAB-donor-CU proxy (to the IAB-node-DU). By establishing F1-C with the target IAB-donor-CU via the source path, the IAB-node-DU may establish a new transport network layer association (TNLA) with the target IAB-donor-CU that it uses for its F1-C signalling.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, the base station 102 may be an IAB node (either IAB-donor node or IAB node) that includes a centralized unit (CU), a distributed unit (DU), and/or IAB-mobile terminal (MT). The base station 102 may have a modem 514 and a communication management module 450 (see FIG. 4) for to implement techniques for migrating integrated access and backhaul (IAB) nodes, and more particularly the IAB-mobile terminal (IAB-MT), IAB distributed units (IAB-DUs), and/or user equipments (UEs) connected to the IAB node, from the source centralized unit (CU) to a target IAB-donor-CU of a base station. Features of the present disclosure achieve such migration by configuring the IAB-DU to establish F1-connection (F1-C) with the target IAB-donor-CU via the source path before the UE context transfer occurs. To this end, the source IAB-donor-CU may initiate an F1-C establishment between IAB-node DU and target IAB-donor-CU. The source IAB-donor-CU may do so by acting or presenting as an IAB-node-DU proxy to the target IAB-donor-CU. At the same time, the source IAB-donor-CU may act or present as a target-IAB-donor-CU proxy to the IAB-node-DU. Thus, in some cases, the source IAB-donor-CU may present as both the IAB-node-DU proxy (to the target IAB-donor-CU) and as a target-IAB-donor-CU proxy (to the IAB-node-DU). By establishing F1-C with the target IAB-donor-CU via the source path, the IAB-node-DU may establish a new transport network layer association (TNLA) with the target IAB-donor-CU that it uses for its F1-C signalling.

The base stations 102 may also be configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
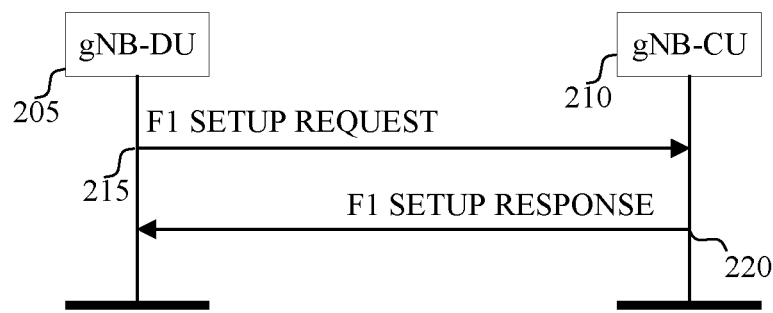
FIG. 2 is a call-flow diagram of an example of F1-connection that may be established between an IAB-donor centralized unit (CU) and IAB-donor distributed unit (DU) and IAB-node DUs in accordance with aspects of the present disclosure.

FIG. 2 is a timing diagram 200 of an example of F1-connection that may be established between an IAB-donor CU 210 and IAB-donor DUs and IAB-node DUs. As noted above, in IAB network architecture, one or more base stations may include a centralized unit (CU) 210 and a distributed unit (DU) 205, and may be referred to as donor base stations (e.g., or IAB donors). One or more DUs 205 associated with a donor base station may be partially controlled by one or more CUs 210 associated with the donor base station. A base station CU 210 may be a component of a database, data center, core network, or network cloud. The one or more donor base stations (e.g., IAB donors) may be in communication with one or more additional base stations (e.g., IAB nodes or relay nodes) and UEs.

The interface between DU 205 and CU 210 is generally referred to as the F1 interface. Specifically, an F1 interface or F1-connection (F1-C) may be established between the IAB-donor CU 210 and each of the IAB-donor DUs 205 and IAB-node DUs 205. The F1-AP/SCTP connection may be used to exchange control plane (CP) messages. During the F1 setup procedure, a gNB-DU 205 may send an F1 SETUP REQUEST message 215 to the gNB-CU 210 that includes a list of cells that are configured and ready to be activated. In turn, the gNB-CU 210 may send an F1 SETUP RESPONSE message 220 to the gNB-DU 205 that optionally includes a list of cells to be activated. Each served cell on the gNB-DU 205 may be identified by NR cell global identity (NR CGI) and/or NR physical cell ID (NR PCI) pair. In some aspects, F1AP services may be divided into non-UE associated services and UE-associated services In some aspects, stream control transmission protocol (SCTP) may be supported as the transport layer for F1-C signaling bearer. In such cases, the gNB-DU and gNB-CU may support a configuration with a single SCTP association per gNB-DU/gNB-CU pair. Configurations with multiple SCTP endpoints per gNB-DU/gNB-CU pair may also be supported. When configurations with multiple SCTP associations are supported, the gNB-CU/gNB-DU may request to dynamically add/remove SCTP associations between the gNB-DU/gNB-CU pair. Transport network redundancy may be achieved by SCTP multi-homing between two endpoints, of which one or both is assigned with multiple IP addresses. SCTP end-points may also support a multi-homed remote SCTP end-point.

Figure 3A:
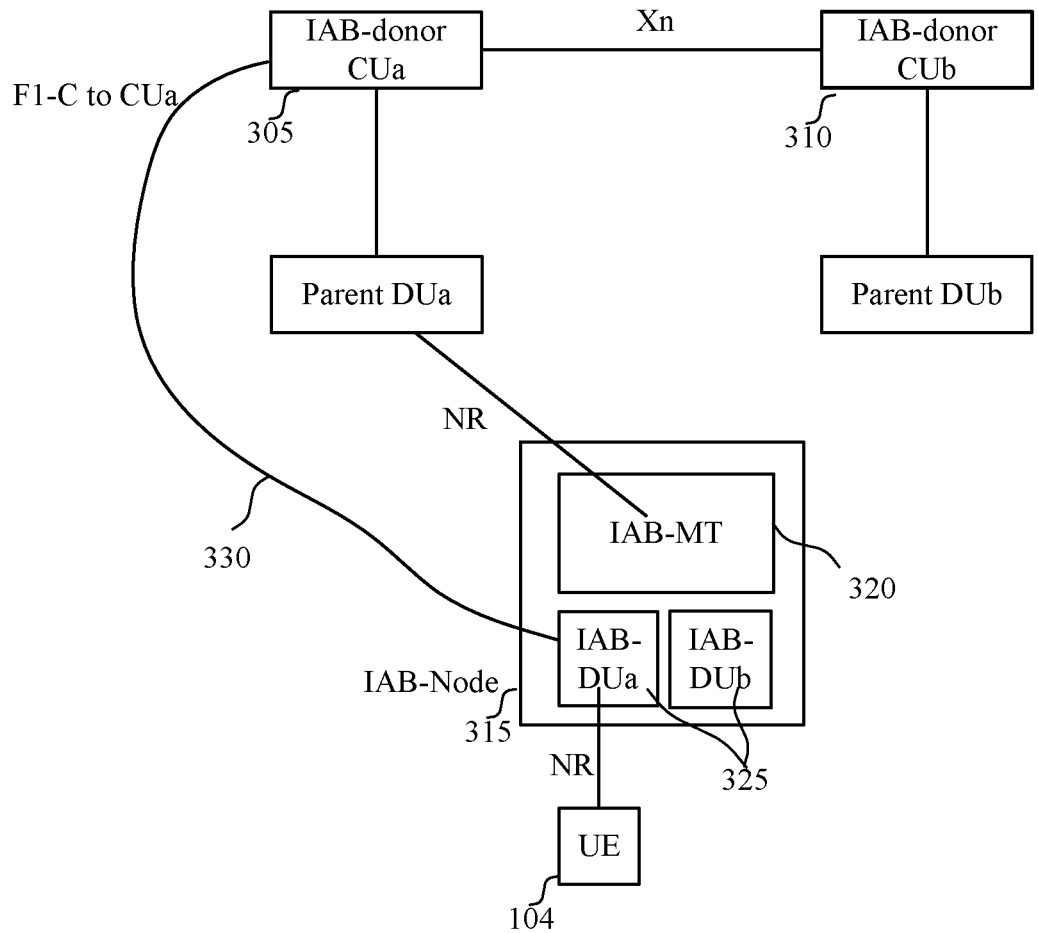
FIG. 3A is a schematic diagram of an IAB inter-donor topology adaptation in accordance with aspects of the present disclosure.

FIG. 3A is a schematic diagram 300 of an IAB inter-donor topology adaptation. Specifically, in JAB network systems, when a mobile terminal (MT) 320 of an IAB-node 351 performs a handover from a source CU 305 (e.g., CU-a) to a target CU 310 (e.g., CU-b), a DU 325 associated with the JAB node 315 may have to migrate to the target CU 310 (e.g., CU-b). In some examples, a first DU 325-*a* may be associated with a source CU 305 and second DU 325-*b* may be associated with a target CU 310. The second DU 325-*b* may refer to the migrated DU of the JAB node 315 and the IAB node 315 may need to establish F1-C with the target CU. However, in order to perform such handover, the IAB-DU 325 may require target path availability to the target CU 310 that may only be available to DU 325 after the IAB-MT 320 switches to parent Dub 325. Similarly, the UEs 104 connected to the IAB-node 315 may also need to perform handover to the target CU-b 310 when the MT 320 switches over from source CU 305 (e.g., CU-a) to a target CU 310 (e.g., CU-b). However, in order to conduct such handover, the handover command delivery requires the source path availability that may only be available to the UE before the IAB-MT 320 switches to parent Dub 325. Thus, in current systems, attempting to migrate IAB-MT 320, IAB-DU 325, and UE 104 from the source CU 305 to the target IAB-donor-CU 310 may lead to deadlock scenario.

Aspects of the present disclosure provide techniques to overcome such deadlock. Specifically, in some aspects, the IAB-DU 325 may establish F1-C with the target IAB-donor-CU 310 via the source path 330 before the parent switch of the IAB-MT 320 occurs such that a handover command to the UE 104 can still be forwarded along the source path. To this end, the source IAB-donor-CU 305 may initiate an F1-C establishment between IAB-node DU 325 and target IAB-donor-CU 310. The source IAB-donor-CU 305 may do so by acting or presenting as an IAB-node-DU proxy to the target IAB-donor-CU 310. At the same time, the source IAB-donor-CU 305 may act or present as a target-IAB-donor-CU proxy to the IAB-node-DU 325. Thus, in some cases, the source IAB-donor-CU 305 may present as both the IAB-node-DU proxy (to the target IAB-donor-CU) and as a target-IAB-donor-CU proxy (to the IAB-node-DU). By establishing F1-C with the target IAB-donor-CU 310 via the source path, the IAB-node-DU 325 may then establish a new TNLA with the target IAB-donor-CU 310 that it uses for the F1-C signalling.

Figure 3B:
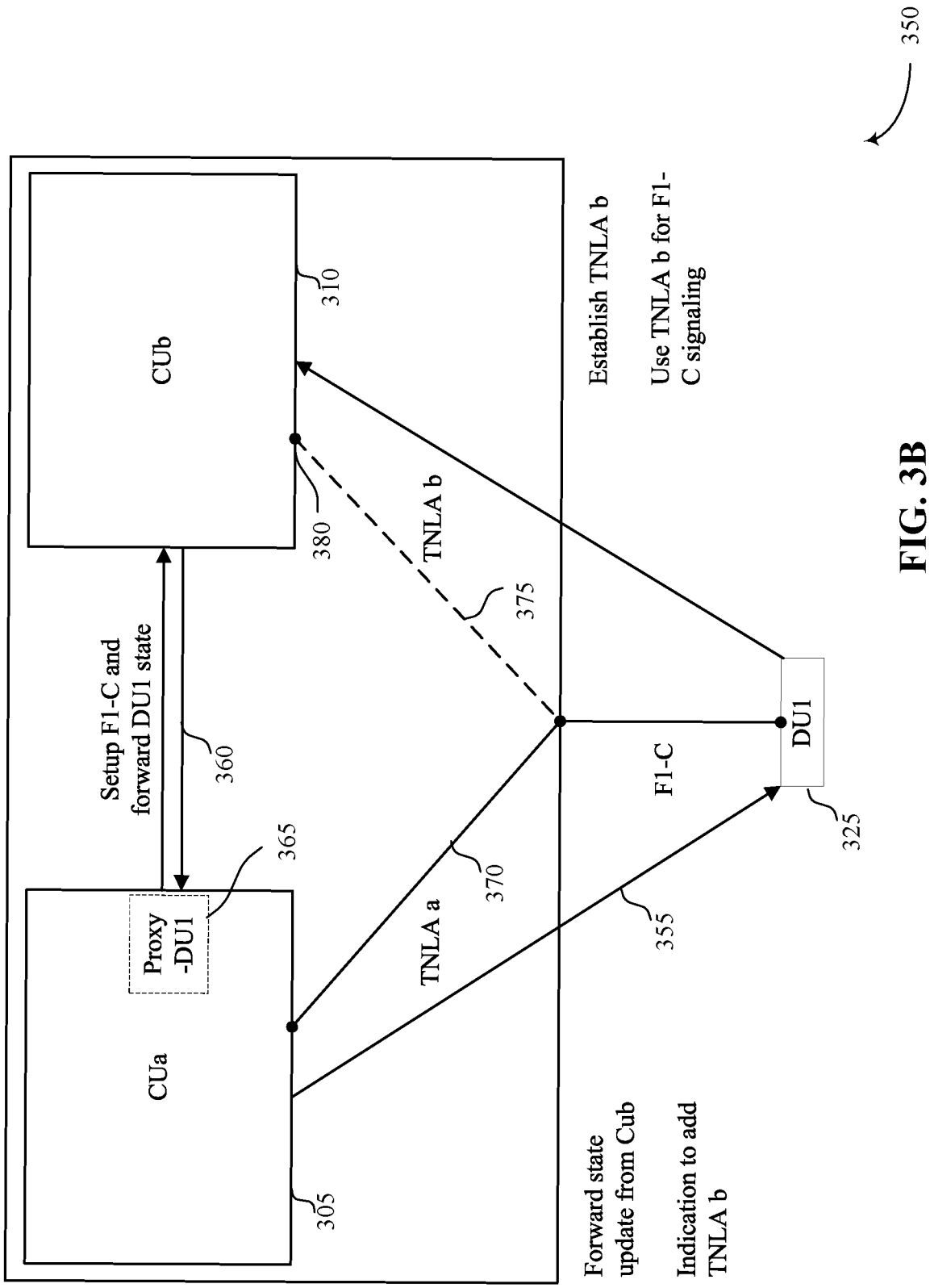
FIG. 3B is a schematic diagram of an example IAB-DU migration in accordance with various aspects of the present disclosure.

FIG. 3B is a schematic diagram 350 of an example IAB-DU migration that reflects the techniques of migrating IAB-DU from the source-CU 305 to the target CU 310. The IAB-donor-CU, either source-CU 305 and/or target CU 310, may be a gNB-CU. In some examples, a first IAB-donor-CU 305 (or a "source CU") may establish a first signaling connection 355 to an IAB-node 315 (as illustrated with the IAB-DU 325). In some aspects, the DU 325 may be either an IAB-donor-DU or a gNB-DU. In some aspects, the first signaling connection may be F1-C or radio resource control (RRC) connection.

The first IAB-donor-CU 305 may then setup a second connection 360 a second IAB-donor-CU 310 (or a "target CU"). In such instance, the second connection 360 may be a F-1C signaling. Once the first IAB-donor-CU 305 has established the second signaling connection 360 with the second IAB-CU 310, the first IAB-donor-CU 305 may act as a proxy 365 for a distributed unit of the IAB-node 315 and forward the state of the IAB-node-DU 325 to the second IAB-donor-CU 310.

In some examples, forwarding the IAB-node-DU's state to the second IAB-donor-CU may include forwarding of a configuration sent by IAB-node-DU 325 to the first IAB-donor-CU 305 and/or forwarding of a configuration sent by first IAB-donor-CU 305 to the IAB-node-DU 325. In some aspects, the first IAB-donor-CU 305 may further forward a second state update between the IAB-node-DU 325 and the second IAB-donor-CU 310. The forwarding a state/state update to the second IAB-donor-CU 310 may also use an F1 Setup Request message or gNB-DU configuration update message or gNB-CU configuration update acknowledge message. Furthermore, forwarding a state update to the IAB-node-DU 325 may utilize one or more of F1 Setup Response message, gNB-DU configuration update acknowledge message, or gNB-CU Configuration Update message In some aspects, the IAB-node-DU state information that is forwarded by the first IAB-donor-CU 305 to the second IAB-donor-CU 210 may include one or more of a configuration of a cell served by the IAB-node-DU, transport layer information for an SCTP connection that carries UE-associated and/or non-UE associated F1-C signaling, transport layer info for an F1-U GTP-U tunnel for a child connected to the IAB-node-DU, or a context of a child connected to the IAB-node-DU, an identifier that is associated with the connection between the IAB-DU and the IAB-donor-CU, gNB-CU, a tunnel endpoint identifier between gNB-DU and gNB-CU, a stream between gNB-DU and gNB-CU, or child connected to the IAB-node-DU.

In some examples, the first IAB-donor-CU 305 may also indicate the same gNB-DU-ID as that of the IAB-node-DU 325 upon establishing the second signaling connection 360. In some examples, the first IAB-donor-CU 305 may indicate to the IAB-DU 325 a TNL endpoint for the second IAB-donor-CU 380. CU 305 may achieve this by providing an additional TNL endpoint to be used by the IAB-DU 325 to establish a new TNLA for the first signaling connection of IAB-DU. This may be possible in accordance with aspects of the present disclosure because the CU 305 may have multiple TNL endpoints for the first signaling connection that the CU 305 can select from. However, since the newly indicated TNL endpoint by CU-a 305 to the IAB-DU is configured that of Cub 310 instead of being an additional CU-a TNL endpoint for the first signaling connection, aspects of the present disclosure allow a direct TNLA to be established between a second CU 310 and the IAB DU 325. The additional TNL endpoint 380 configured on second IAB-donor-CU 310 may comprise internet protocol (IP) address information for the second IAB-donor-CU 310. The first IAB-donor-CU 305 may also indicate the TNLA 375 to be added using a gNB-CU configuration update message. In some aspects, the gNB-CU configuration update message may be sent using the TNLA 370. In some aspects, the first IAB-donor-CU 305 may request the IAB-node 315 to acknowledge (ACK) the TNLA setup using IP address of second IAB-donor-CU 315 on the TNLA-b 375.

In some aspects, the IAB-node-DU 325 may establish a second TNLA 375 (e.g. SCTP association) with the second IAB-donor-CU 310 based on the addition of the TNL Endpoint 380 for the second IAB-donor-CU 310 by the first IAB-donor-CU 305. In such instance, the first IAB-donor-CU 305 may indicate to the IAB-node-DU 325 to use the second TNLA 375 for the first signaling connection. After the second TNLA 375 is established, the first IAB-donor-CU may instruct the IAB-node-DU 325 to remove a first TNLA 370 for the first signaling connection. The IAB-node-DU 325 may then include the gNB-DU ID in F1-C signaling that uses the second TNLA 375. The IAB-node-DU 325 may also transmit a gNB-CU configuration update acknowledge message or gNB-DU configuration update message to the second IAB-donor-CU 310 after the second TNLA 375 becomes operational.

In some aspects, the first IAB-donor-CU 305 may indicate to the IAB-node 315 that the first IAB-donor-CU 305 is acting as a proxy for the second IAB-donor-CU 310. The first IAB-donor-CU 305 may also provide an identifier of the second-IAB-donor-CU 310 to the IAB-node 315. In some examples, the first IAB-donor-CU 305 may request the IAB-node-DU 325 to include the gNB-DU ID in F1-C signaling that uses the new TNLA.

In some examples, the first IAB-donor-CU 305 may then indicate to the second IAB-donor-CU 310 that the first IAB-donor-CU 305 is acting as a proxy for the IAB-node-DU 325. The first IAB-donor-CU 305 may then transfer context for or indicate the corresponding IAB-node-MT 320 to the second IAB-donor-CU 310. The first IAB-donor-CU 305 may indicate to the second IAB-donor-CU 310 that a second TNLA 375 will be established to be used by the IAB-node 315 for the second signaling connection. To this end, the second IAB-donor-CU 310 may request that the first IAB-donor-CU 305 remove a third TNLA for the second signaling connection after the IAB-node establishes the second TNLA 375. As such, the first IAB-donor-CU 305 may remove the third TNLA used for the second signaling connection after indicating to the IAB-node 315 to establish the second TNLA 375 and/or after receiving an indication from the IAB-node 315 or the second IAB-donor-CU 310 that the second TNLA 375 has become operational.

In some cases, the second IAB-donor-CU 310 may provide the first IAB-donor-CU 305 with a new gNB-CU identifier that the first IAB-donor-CU 305 may send an update to the IAB-node 315. The gNB-CU identifier may be a gNB-CU name. The gNB-CU identifier may be a gNB-ID based on which the first IAB-donor-CU reconfigures a cell ID for a cell served by the IAB-node-DU. The first IAB-donor-CU 305 may request the new gNB-CU identifier from the second IAB-donor-CU 310.

In some examples, the second IAB-donor-CU 310 may provide the IAB-node 315 with a new gNB-CU identifier after the IAB-node 315 establishes a TNLA 375 with the second IAB-donor-CU 310. Additionally or alternatively, the first IAB-donor-CU 305 may indicate to the second IAB-donor-CU 310 to provide a new gNB-CU identifier to the IAB-node after the second TNLA 375 becomes operational. The first IAB-donor-CU 305 may request the second IAB-donor-CU 310 to use the old gNB-CU identifier for the second signaling connection.

Figure 4:
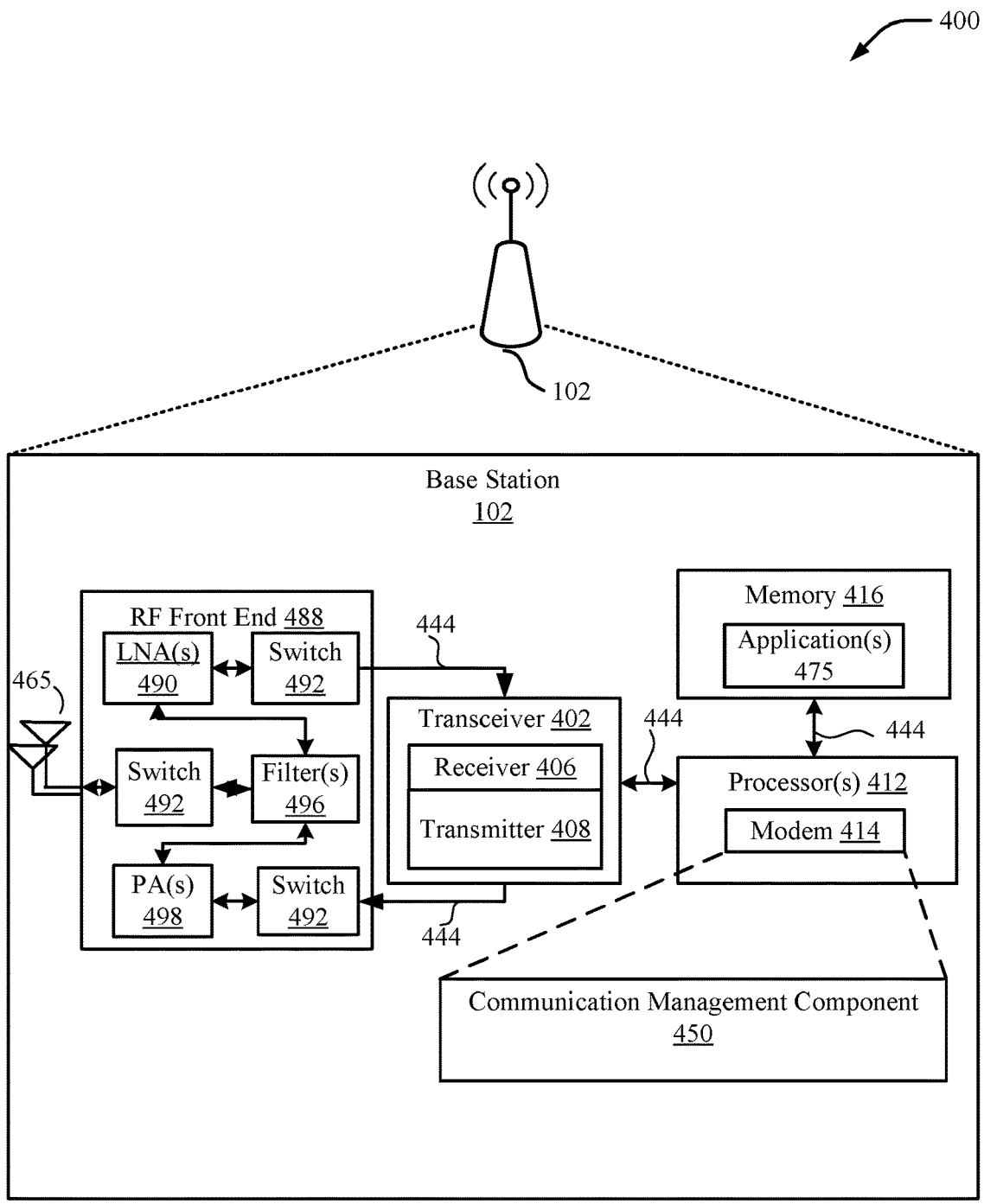
FIG. 4 is a schematic diagram of an example implementation of various components of a base station in accordance with various aspects of the present disclosure.

FIG. 4 illustrates a hardware components and subcomponents of a device that may be a base station 102 for implementing one or more methods (e.g., method 500) described herein in accordance with various aspects of the present disclosure. For example, one example of an implementation of the base station 102 may include a variety of components, some of which have already been described above, but including components such as one or more processors 412, memory 416 and transceiver 402 in communication via one or more buses 444, which may operate in conjunction with the communication management component 4505 to perform functions described herein related to including one or more methods (e.g., 500) of the present disclosure. In some examples, the base station 102 may be an IAB node (either IAB-donor node or IAB node) that includes a centralized unit (CU), a distributed unit (DU), and/or IAB-mobile terminal (MT).

Particularly, communication management component 450 may implement techniques for migrating integrated access and backhaul (IAB) nodes, and more particularly the IAB-mobile terminal (IAB-MT), IAB distributed units (IAB-DUs), and/or user equipments (UEs) connected to the IAB node, from the source centralized unit (CU) to a target IAB-donor-CU of a base station. Features of the present disclosure achieve such migration by configuring the IAB-DU to establish F1-connection (F1-C) with the target IAB-donor-CU via the source path before the UE context transfer occurs. To this end, the source IAB-donor-CU may initiate an F1-C establishment between IAB-node DU and target IAB-donor-CU. The source IAB-donor-CU may do so by acting or presenting as an IAB-node-DU proxy to the target IAB-donor-CU. At the same time, the source IAB-donor-CU may act or present as a target-IAB-donor-CU proxy to the IAB-node-DU. Thus, in some cases, the source IAB-donor-CU may present as both the IAB-node-DU proxy (to the target IAB-donor-CU) and as a target-IAB-donor-CU proxy (to the IAB-node-DU). By establishing F1-C with the target IAB-donor-CU via the source path, the IAB-node-DU may establish a new transport network layer association (TNLA) with the target IAB-donor-CU that it uses for its F1-C signalling.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to communication management component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with initial access module 450 may be performed by transceiver 402.

The memory 416 may be configured to store data used herein and/or local versions of application(s) 475 or communication management component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining communication management component 450 and/or one or more of its subcomponents, and/or data associated therewith, when the base station 102 is operating at least one processor 412 to execute communication management component 450 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 465 and transceiver 402 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device can communicate with, for example, one or more UEs 104. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

Figure 5:
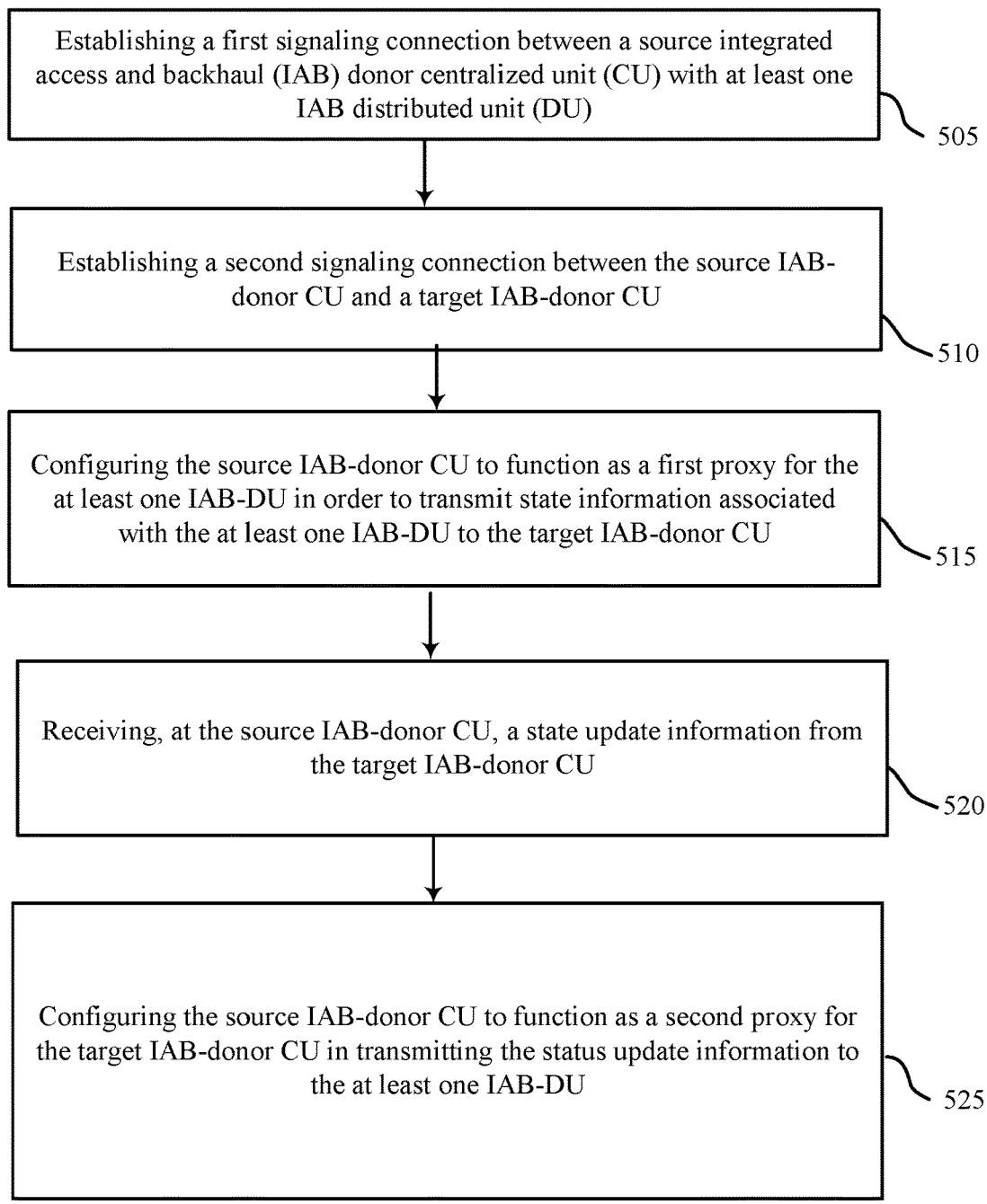
FIG. 5 is a flow diagram of an example of a method of wireless communication implemented by the base station in accordance with aspects of the present disclosure.

Referring to FIG. 5, an example method 500 for wireless communications in accordance with aspects of the present disclosure may be performed by one or more base stations 102 discussed with reference to FIGS. 1-2. Although the method 500 is described below with respect to the elements of the base station 102, other components may be used to implement one or more of the steps described herein.

At block 505, the method 500 may include establishing a first signaling connection between a source IAB-donor-CU with at least one IAB-DU. In some examples, the first signaling connection between the source IAB-donor-CU and the at least one IAB-DU may be one of F1-connection (F1-C) or radio resource control (RRC) connection. The at least one IAB-DU may be one of an IAB-donor-DU or an IAB-node-DU. Aspects of block 505 may be performed by the transceiver 402, modem 414, and communication management component 450 as described with reference to FIG. 4. Thus, communication management component 450, modem 414, processor 412, transceiver 402, and/or the base station or one of its subcomponents may define the means for establishing a first signaling connection between a source IAB-donor-CU of a base station with at least one IAB-DU.

At block 510, the method 500 may include establishing a second signaling connection between the source IAB-donor CU and a target IAB-donor CU. In some examples, the second signaling connection between the source IAB-donor-CU and the target IAB-donor-CU may be the F1-connection. In some examples, the IAB-donor-CU may be a base station CU. Aspects of block 510 may be performed by the transceiver 402, modem 414, and communication management component 450 as described with reference to FIG. 4. Thus, communication management component 450, modem 414, processor 412, transceiver 402, and/or the base station or one of its subcomponents may define the means for establishing a second signaling connection between the source IAB-donor CU and a target IAB-donor CU.

At block 515, the method 500 may include configuring the source IAB-donor CU to function as a first proxy for the at least one IAB-DU in order to transmit state information associated with the at least one IAB-DU to the target IAB-donor CU. In some aspects the state information associated with the at least one IAB-DU may include one or more of: a configuration of a cell served by the at least one IAB-DU, a context of a child connected to the at least one IAB-DU, a transport layer information for a stream Control Transmission Protocol (SCTP) connection that carries associated F1-connection signaling, a transport layer information for a child connected to the IAB-DU, or an identifier of one of a base station-DU, base station-CU, connection between the base station-DU and the base station-CU, a stream between the base station-DU and the base station-CU, or a child connected to the at least one IAB-DU. The state information may include transport layer information for a connection between the IAB-donor-CU and the at least one IAB-DU, an identifier of a connection between the IAB-donor-CU and the at least one IAB-DU, and an identifier of one or more of the at least one IAB-DU, the IAB-donor-CU or a child connected to the at least one IAB-DU used on a connection between the IAB-donor-CU and the at least one IAB-DU.

The state information associated with the at least one IAB-DU that is transmitted from the IAB-donor CU to the target IAB-donor CU may also comprise forwarding a configuration information associated with the at least one IAB-DU to the target IAB-donor CU that the source IAB-donor CU had previously transmitted to the at least one IAB-DU. The state information associated with the at least one IAB-DU that is transmitted from the IAB-donor CU to the target IAB-donor CU may also comprise forwarding a configuration information of the at least one IAB-DU that is received from the at least one IAB-DU at the source IAB-donor CU.

Configuring the source IAB-donor CU to function as the first proxy for the at least one IAB-DU may include determining an identifier of an IAB-mobile terminal (IAB-MT) associated with the at least one IAB-DU, and transmitting the identifier of the IAB-MT to the target IAB-donor CU in order to proxy for the at least one IAB-DU. In other examples, configuring the source IAB-donor CU to function as the first proxy for the at least one IAB-DU may comprise determining an identifier associated with at least one IAB-DU and representing the source IAB-donor CU as the at least one IAB-DU to the target IAB-donor-CU by adopting the identifier of the at least one IAB-DU for communications with the target IAB-donor-CU.

Aspects of block 515 may be performed by the transceiver 402, modem 414, and communication management component 450 as described with reference to FIG. 4. Thus, communication management component 450, modem 414, processor 412, transceiver 402, and/or the base station or one of its subcomponents may define the means for configuring the source IAB-donor CU to function as a first proxy for the at least one IAB-DU in order to transmit state information associated with the at least one IAB-DU to the target IAB-donor CU.

At block 520, the method 500 may include receiving, at the IAB-donor CU, a state update information from the target IAB-donor CU. In some examples, receiving the state update information from the target IAB-donor CU may comprise receiving, at the source IAB-CU, an updated base station-CU identifier from the target IAB-CU and reconfiguring, at the source IAB-CU, a cell identity (ID) for a cell served by the at least one IAB-DU based in part on the updated base station-CU identifier received from the target IAB-CU. The method may also include generating the state update information associated based in part on the cell-ID. Aspects of block 520 may be performed by the transceiver 402, modem 414, and communication management component 450 as described with reference to FIG. 4. Thus, communication management component 450, modem 414, processor 412, transceiver 402, and/or the base station or one of its subcomponents may define the means for receiving, at the IAB-donor CU, a state update information from the target IAB-donor CU.

At block 525, the method 500 may include configuring the source IAB-donor CU to function as a second proxy for the target IAB-donor CU in transmitting the state update information to the at least one IAB-DU. In some examples, the target IAB-donor CU and the at least one IAB-DU may use one or both of the state information or the state update information in order to establish a TNLA directly between the target IAB-donor-CU and the at least one IAB-DU. In other examples, the source IAB-donor-CU may indicate to the at least one IAB-DU a transport network layer (TNL) endpoint for the target IAB-donor-CU to enable the at least one IAB-DU to establish a transport network layer association (TNLA) TNLA between the target IAB-donor-CU and the at least one IAB-DU.

In some aspects, configuring the source IAB-donor CU to function as a second proxy for the target IAB-donor CU may include determining an identifier associated with the target IAB-donor CU, and representing the source IAB-donor CU as the target IAB-donor CU to the at least one IAB DU by adopting the identifier of the target IAB-donor CU for communications with the at least one IAB-DU.

Aspects of block 525 may be performed by the transceiver 402, modem 414, and communication management component 450 as described with reference to FIG. 4. Thus, communication management component 450, modem 414, processor 412, transceiver 402, and/or the base station or one of its subcomponents may define the means for configuring the source IAB-donor CU to function as a second proxy for the target IAB-donor CU in transmitting the state update information to the at least one IAB-DU.

Some Further Example Clauses

Implementation examples are described in the following numbered clauses:

1. A method for wireless communications, comprising:
   establishing a first signaling connection between a source integrated access and backhaul (IAB) donor centralized unit (CU) with at least one IAB distributed unit (DU);
   establishing a second signaling connection between the source IAB-donor CU and a target IAB-donor CU;
   configuring the source IAB-donor CU to function as a first proxy for the at least one IAB-DU in order to transmit state information associated with the at least one IAB-DU to the target IAB-donor CU;
   receiving, at the source IAB-donor CU, a state update information from the target IAB-donor CU; and
   configuring the source IAB-donor CU to function as a second proxy for the target IAB-donor CU in transmitting the state update information to the at least one IAB-DU.

2. The method of clause 1, wherein configuring the source IAB-donor CU to function as the second proxy for the target IAB-donor CU comprises:
   determining an identifier associated with the target IAB-donor CU; and
   representing the source IAB-donor CU as the target IAB-donor CU to the at least one IAB DU by adopting the identifier of the target IAB-donor CU for communications with the at least one IAB-DU.

3. The method of any of the preceding clauses 1-2, wherein configuring the source IAB-donor CU to function as the first proxy for the at least one IAB-DU comprises:
   determining an identifier associated with at least one IAB-DU; and
   representing the source IAB-donor CU as the at least one IAB-DU to the target IAB-donor-CU by adopting the identifier of the at least one IAB-DU for communications with the target IAB-donor-CU.

4. The method of any of the preceding clauses 1-3, wherein configuring the source IAB-donor CU to function as the first proxy for the at least one IAB-DU comprises:
   determining an identifier of an IAB-mobile terminal (IAB-MT) associated with the at least one IAB-DU; and
   transmitting the identifier of the IAB-MT to the target IAB-donor CU in order to proxy for the at least one IAB-DU.

5. The method of any of the preceding clauses 1-4, wherein the state information associated with the at least one IAB-DU includes one or more of:
   a configuration of a cell served by the at least one IAB-DU,
   a context of a child connected to the at least one IAB-DU,
   a transport layer information for a connection between the IAB-donor-CU and the at least one IAB-DU,
   an identifier of a connection between the IAB-donor-CU and the at least one IAB-DU, or
   an identifier of one or more of the at least one IAB-DU, the IAB-donor-CU or a child connected to the at least one IAB-DU used on a connection between the IAB-donor-CU and the at least one IAB-DU.

6. The method of any of the preceding clauses 1-5, wherein the state information associated with the at least one IAB-DU that is transmitted from the IAB-donor CU to the target IAB-donor comprises:
forwarding a configuration information of the at least one IAB-DU that is received from the at least one IAB-DU at the source IAB-donor CU.
7. The method of any of the preceding clauses 1-6, wherein the state information associated with the at least one IAB-DU that is transmitted from the IAB-donor CU to the target IAB-donor CU comprises:
forwarding a configuration information associated with the at least one IAB-DU to the target IAB-donor CU that the source IAB-donor CU had previously transmitted to the at least one IAB-DU.
8. The method of any of the preceding clauses 1-7, wherein receiving the state update information from the target IAB-donor CU comprises:
receiving, at the source IAB-CU, an updated base station-CU identifier from the target IAB-CU;
reconfiguring, at the source IAB-CU, a cell identity (ID) for a cell served by the at least one IAB-DU based in part on the updated base station-CU identifier received from the target IAB-CU; and
generating the state update information associated based in part on the cell-ID.
9. The method of any of the preceding clauses 1-8, wherein the first signaling connection between the source IAB-donor-CU and the at least one IAB-DU is one of F1-connection (F1-C) or radio resource control (RRC) connection, and
wherein the second signaling connection between the source IAB-donor-CU and the target IAB-donor-CU is the F1-connection.
10. The method of any of the preceding clauses 1-9, wherein the at least one IAB-DU is one of an IAB-donor-DU or an IAB-node-DU.
11. The method of any of the preceding clauses 1-10, wherein the target IAB-donor CU and the at least one IAB-DU use one or both of the state information or the state update information in order to establish a transport network layer association (TNLA) directly between the target IAB-donor-CU and the at least one IAB-DU.
12. The method of any of the preceding clauses 1-11, wherein the source IAB-donor-CU indicates to the at least one IAB-DU a transport network layer (TNL) endpoint for the target IAB-donor-CU to enable the at least one IAB-DU to establish a transport network layer association (TNLA) TNLA between the target IAB-donor-CU and the at least one IAB-DU.
13. The method of any of the preceding clauses 1-12, wherein the IAB-donor-CU is a base station CU.
14. An apparatus for wireless communications, comprising:
at least one processor;
and memory coupled to the at least one processor, the memory including instructions executable by the at least one processor to cause the apparatus to:
establish a first signaling connection between a source integrated access and backhaul (IAB) donor centralized unit (CU) with at least one IAB distributed unit (DU);
establish a second signaling connection between the source IAB-donor CU and a target IAB-donor CU;
configure the source IAB-donor CU to function as a first proxy for the at least one IAB-DU in order to transmit state information associated with the at least one IAB-DU to the target IAB-donor CU;
receive, at the source IAB-donor CU, a state update information from the target IAB-donor CU; and
configure the source IAB-donor CU to function as a second proxy for the target IAB-donor CU in transmitting the state update information to the at least one IAB-DU.
15. The apparatus of clause 14, wherein the instructions to configure the source IAB-donor CU to function as the second proxy for the target IAB-donor CU are further executable by the at least one processor to cause the apparatus to:
determine an identifier associated with the target IAB-donor CU; and
represent the source IAB-donor CU as the target IAB-donor CU to the at least one IAB DU by adopting the identifier of the target IAB-donor CU for communications with the at least one IAB-DU.
16. The apparatus of any of the preceding clauses 14-15, wherein the instructions to configure the source IAB-donor CU to function as the first proxy for the at least one IAB-DU are further executable by the at least one processor to cause the apparatus to:
determine an identifier associated with at least one IAB-DU; and
represent the source IAB-donor CU as the at least one IAB-DU to the target IAB-donor-CU by adopting the identifier of the at least one IAB-DU for communications with the target IAB-donor-CU.
17. The apparatus of any of the preceding clauses 14-16, wherein the instructions to configure the source IAB-donor CU to function as the first proxy for the at least one IAB-DU are further executable by the at least one processor to cause the apparatus to:
determine an identifier of an IAB-mobile terminal (IAB-MT) associated with the at least one IAB-DU; and
transmit the identifier of the IAB-MT to the target IAB-donor CU in order to proxy for the at least one IAB-DU.
18. The apparatus of any of the preceding clauses 14-17, wherein the state information associated with the at least one IAB-DU includes one or more of:
a configuration of a cell served by the at least one IAB-DU,
a context of a child connected to the at least one IAB-DU,
a transport layer information for a connection between the IAB-donor-CU and the at least one IAB-DU,
an identifier of a connection between the IAB-donor-CU and the at least one IAB-DU, or
an identifier of one or more of the at least one IAB-DU, the IAB-donor-CU or a child connected to the at least one IAB-DU used on a connection between the IAB-donor-CU and the at least one IAB-DU.
19. The apparatus of any of the preceding clauses 14-18, wherein the state information associated with the at least one IAB-DU that is transmitted from the IAB-donor CU to the target IAB-donor comprises:
forwarding a configuration information of the at least one IAB-DU that is received from the at least one IAB-DU at the source IAB-donor CU.
20. The apparatus of any of the preceding clauses 14-19, wherein the state information associated with the at least one IAB-DU that is transmitted from the IAB-donor CU to the target IAB-donor CU comprises:
forwarding a configuration information associated with the at least one IAB-DU to the target IAB-donor CU that the source IAB-donor CU had previously transmitted to the at least one IAB-DU.

21. The apparatus of any of the preceding clauses 14-20, wherein the instructions to receive the state update information from the target IAB-donor CU are further executable by the at least one processor to cause the apparatus to:
receive, at the source IAB-CU, an updated base station-CU identifier from the target IAB-CU;
reconfigure, at the source IAB-CU, a cell identity (ID) for a cell served by the at least one IAB-DU based in part on the updated base station-CU identifier received from the target IAB-CU; and
generate the state update information associated based in part on the cell-ID.

22. The apparatus of any of the preceding clauses 14-21, wherein the first signaling connection between the source IAB-donor-CU and the at least one IAB-DU is one of F1-connection (F1-C) or radio resource control (RRC) connection, and
wherein the second signaling connection between the source IAB-donor-CU and the target IAB-donor-CU is the F1-connection.

23. The apparatus of any of the preceding clauses 14-22, wherein the at least one IAB-DU is one of an IAB-donor-DU or an IAB-node-DU.

24. The apparatus of any of the preceding clauses 14-23, wherein the target IAB-donor CU and the at least one IAB-DU use one or both of the state information or the state update information in order to establish a transport network layer association (TNLA) directly between the target IAB-donor-CU and the at least one IAB-DU.

25. The apparatus of any of the preceding clauses 14-24, wherein the source IAB-donor-CU indicates to the at least one IAB-DU a transport network layer (TNL) endpoint for the target IAB-donor-CU to enable the at least one JAB-DU to establish a transport network layer association (TNLA) TNLA between the target IAB-donor-CU and the at least one IAB-DU.

26. The apparatus of any of the preceding clauses 14-25, wherein the IAB-donor-CU is a base station CU.

27. A non-transitory computer readable medium storing instructions, executable by a processor, for wireless communications, comprising instructions for: establishing a first signaling connection between a source integrated access and backhaul (IAB) donor centralized unit (CU) of a base station with at least one JAB distributed unit (DU);
establishing a first signaling connection between a source integrated access and backhaul (IAB) donor centralized unit (CU) with at least one IAB distributed unit (DU);
establishing a second signaling connection between the source IAB-donor CU and a target IAB-donor CU;
configuring the source IAB-donor CU to function as a first proxy for the at least one IAB-DU in order to transmit state information associated with the at least one IAB-DU to the target IAB-donor CU;
receiving, at the source IAB-donor CU, a state update information from the target IAB-donor CU; and
configuring the source IAB-donor CU to function as a second proxy for the target IAB-donor CU in transmitting the state update information to the at least one IAB-DU.

28. The non-transitory computer readable medium of clause 27, wherein configuring the source IAB-donor CU to function as the second proxy for the target IAB-donor CU further include instructions for:
determining an identifier associated with the target IAB-donor CU; and
representing the source IAB-donor CU as the target IAB-donor CU to the at least one IAB DU by adopting the identifier of the target IAB-donor CU for communications with the at least one IAB-DU.

29. The non-transitory computer readable medium of clauses 27 or 28, wherein configuring the source IAB-donor CU to function as the first proxy for the at least one IAB-DU further include instructions for:
determining an identifier associated with at least one IAB-DU; and
representing the source IAB-donor CU as the at least one IAB-DU to the target IAB-donor-CU by adopting the identifier of the at least one IAB-DU for communications with the target IAB-donor-CU.

30. An apparatus for wireless communications, comprising:
means for establishing a first signaling connection between a source integrated access and backhaul (IAB) donor centralized unit (CU) with at least one IAB distributed unit (DU);
means for establishing a second signaling connection between the source IAB-donor CU and a target IAB-donor CU;
means for configuring the source IAB-donor CU to function as a first proxy for the at least one IAB-DU in order to transmit state information associated with the at least one IAB-DU to the target IAB-donor CU;
means for receiving, at the source IAB-donor CU, a state update information from the target IAB-donor CU; and
means for configuring the source IAB-donor CU to function as a second proxy for the target IAB-donor CU in transmitting the state update information to the at least one IAB-DU.

31. The apparatus of clause 30, wherein the means for configuring the source IAB-donor CU to function as the second proxy for the target IAB-donor CU comprises:
means for determining an identifier associated with the target IAB-donor CU; and
means for representing the source IAB-donor CU as the target IAB-donor CU to the at least one IAB DU by adopting the identifier of the target IAB-donor CU for communications with the at least one IAB-DU.

32. The apparatus of any of the preceding clauses 30-31, wherein the means for configuring the source IAB-donor CU to function as the first proxy for the at least one IAB-DU comprises:
means for determining an identifier associated with at least one IAB-DU; and
means for representing the source IAB-donor CU as the at least one IAB-DU to the target IAB-donor-CU by adopting the identifier of the at least one IAB-DU for communications with the target IAB-donor-CU.

33. The apparatus of any of the preceding clauses 30-32, wherein configuring the source IAB-donor CU to function as the first proxy for the at least one IAB-DU comprises:
means for determining an identifier of an IAB-mobile terminal (IAB-MT) associated with the at least one IAB-DU; and
means for transmitting the identifier of the IAB-MT to the target IAB-donor CU in order to proxy for the at least one IAB-DU.

34. The apparatus of any of the preceding clauses 30-33, wherein the state information associated with the at least one IAB-DU includes one or more of:
   a configuration of a cell served by the at least one IAB-DU,
   a context of a child connected to the at least one IAB-DU,
   a transport layer information for a connection between the IAB-donor-CU and the at least one IAB-DU,
   an identifier of a connection between the IAB-donor-CU and the at least one IAB-DU, or
   an identifier of one or more of the at least one IAB-DU, the IAB-donor-CU or a child connected to the at least one IAB-DU used on a connection between the IAB-donor-CU and the at least one IAB-DU.
35. The apparatus of any of the preceding clauses 30-34, wherein the state information associated with the at least one IAB-DU that is transmitted from the IAB-donor CU to the target IAB-donor comprises:
   means for forwarding a configuration information of the at least one IAB-DU that is received from the at least one IAB-DU at the source IAB-donor CU.
36. The apparatus of any of the preceding clauses 30-36, wherein the state information associated with the at least one IAB-DU that is transmitted from the IAB-donor CU to the target IAB-donor CU comprises:
   means for forwarding a configuration information associated with the at least one IAB-DU to the target IAB-donor CU that the source IAB-donor CU had previously transmitted to the at least one IAB-DU.
39. The apparatus of any of the preceding clauses 30-38, wherein the means for receiving the state update information from the target IAB-donor CU comprises:
   means for receiving, at the source IAB-CU, an updated base station-CU identifier from the target IAB-CU;
   means for reconfiguring, at the source IAB-CU, a cell identity (ID) for a cell served by the at least one IAB-DU based in part on the updated base station-CU identifier received from the target IAB-CU; and
   means for generating the state update information associated based in part on the cell-ID.
40. The apparatus of any of the preceding clauses 30-39, wherein the first signaling connection between the source IAB-donor-CU and the at least one IAB-DU is one of F1-connection (F1-C) or radio resource control (RRC) connection, and
   wherein the second signaling connection between the source IAB-donor-CU and the target IAB-donor-CU is the F1-connection.
41. The apparatus of any of the preceding clauses 30-40, wherein the at least one IAB-DU is one of an IAB-donor-DU or an IAB-node-DU.
42. The apparatus of any of the preceding clauses 30-41, wherein the target IAB-donor CU and the at least one IAB-DU use one or both of the state information or the state update information in order to establish a transport network layer association (TNLA) directly between the target IAB-donor-CU and the at least one IAB-DU.
43. The apparatus of any of the preceding clauses 30-42, wherein the source IAB-donor-CU indicates to the at least one IAB-DU a transport network layer (TNL) endpoint for the target IAB-donor-CU to enable the at least one IAB-DU to establish a transport network layer association (TNLA) TNLA between the target IAB-donor-CU and the at least one IAB-DU.
44. The apparatus of any of the preceding clauses 30-43, wherein the IAB-donor-CU is a base station CU.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   establishing a first signaling connection between a source integrated access and backhaul (IAB) donor centralized unit (CU) with at least one IAB distributed unit (DU);
   establishing a second signaling connection between the source IAB-donor CU and a target IAB-donor CU;
   configuring the source IAB-donor CU to function as a first proxy for the at least one IAB-DU in order to transmit state information associated with the at least one IAB-DU to the target IAB-donor CU;
   receiving, at the source IAB-donor CU, a state update information from the target IAB-donor CU; and
   configuring the source IAB-donor CU to function as a second proxy for the target IAB-donor CU in transmitting the state update information to the at least one IAB-DU, wherein configuring the source IAB-donor CU to function as the second proxy for the target IAB-donor CU comprises:
      determining an identifier associated with the target IAB-donor CU; and representing the source IAB-donor CU as the target IAB-donor CU to the at least one IAB DU by adopting the identifier of the target IAB-donor CU for communications with the at least one IAB-DU.

2. The method of claim 1, wherein configuring the source IAB-donor CU to function as the first proxy for the at least one IAB-DU comprises:
determining an identifier associated with at least one IAB-DU; and
representing the source IAB-donor CU as the at least one IAB-DU to the target IAB-donor-CU by adopting the identifier of the at least one IAB-DU for communications with the target IAB-donor-CU.

3. The method of claim 1, wherein configuring the source IAB-donor CU to function as the first proxy for the at least one IAB-DU comprises:
determining an identifier of an IAB-mobile terminal (IAB-MT) associated with the at least one IAB-DU; and
transmitting the identifier of the IAB-MT to the target IAB-donor CU in order to proxy for the at least one IAB-DU.

4. The method of claim 1, wherein the state information associated with the at least one IAB-DU includes one or more of:
a configuration of a cell served by the at least one IAB-DU,
a context of a child connected to the at least one IAB-DU,
a transport layer information for a connection between the IAB-donor-CU and the at least one IAB-DU,
an identifier of a connection between the IAB-donor-CU and the at least one IAB-DU, or
an identifier of one or more of the at least one IAB-DU, the IAB-donor-CU or a child connected to the at least one IAB-DU used on a connection between the IAB-donor-CU and the at least one IAB-DU.

5. The method of claim 1, wherein the state information associated with the at least one IAB-DU that is transmitted from the IAB-donor CU to the target IAB-donor comprises:
forwarding a configuration information of the at least one IAB-DU that is received from the at least one IAB-DU at the source IAB-donor CU.

6. The method of claim 1, wherein the state information associated with the at least one IAB-DU that is transmitted from the IAB-donor CU to the target IAB-donor CU comprises:
forwarding a configuration information associated with the at least one IAB-DU to the target IAB-donor CU that the source IAB-donor CU had previously transmitted to the at least one IAB-DU.

7. The method of claim 1, wherein receiving the state update information from the target IAB-donor CU comprises:
receiving, at the source IAB-CU, an updated base station-CU identifier from the target IAB-CU;
reconfiguring, at the source IAB-CU, a cell identity (ID) for a cell served by the at least one IAB-DU based in part on the updated base station-CU identifier received from the target IAB-CU; and
generating the state update information associated based in part on the cell-ID.

8. The method of claim 1, wherein the first signaling connection between the source IAB-donor-CU and the at least one IAB-DU is one of F1-connection (F1-C) or radio resource control (RRC) connection, and wherein the second signaling connection between the source IAB-donor-CU and the target IAB-donor-CU is the F1-connection.

9. The method of claim 1, wherein the at least one IAB-DU is one of an IAB-donor-DU or an IAB-node-DU.

10. The method of claim 1, wherein the target IAB-donor CU and the at least one IAB-DU use one or both of the state information or the state update information in order to establish a transport network layer association (TNLA) directly between the target IAB-donor-CU and the at least one IAB-DU.

11. The method of claim 1, wherein the source IAB-donor-CU indicates to the at least one IAB-DU a transport network layer (TNL) endpoint for the target IAB-donor-CU to enable the at least one IAB-DU to establish a transport network layer association (TNLA) TNLA between the target IAB-donor-CU and the at least one IAB-DU.

12. The method of claim 1, wherein the IAB-donor-CU is a base station CU.

13. An apparatus for wireless communications, comprising:
at least one processor;
and memory coupled to the at least one processor, the memory including instructions executable by the at least one processor to cause the apparatus to:
establish a first signaling connection between a source integrated access and backhaul (IAB) donor centralized unit (CU) with at least one IAB distributed unit (DU);
establish a second signaling connection between the source IAB-donor CU and a target IAB-donor CU;
configure the source IAB-donor CU to function as a first proxy for the at least one IAB-DU in order to transmit state information associated with the at least one IAB-DU to the target IAB-donor CU;
receive, at the source IAB-donor CU, a state update information from the target IAB-donor CU; and
configure the source IAB-donor CU to function as a second proxy for the target IAB-donor CU in transmitting the state update information to the at least one IAB-DU, wherein the instructions to configure the source IAB-donor CU to function as the second proxy for the target IAB-donor CU are further executable by the at least one processor to cause the apparatus to:
determine an identifier associated with the target IAB-donor CU; and
represent the source IAB-donor CU as the target IAB-donor CU to the at least one IAB DU by adopting the identifier of the target IAB-donor CU for communications with the at least one IAB-DU.

14. The apparatus of claim 13, wherein the instructions to configure the source IAB-donor CU to function as the first proxy for the at least one IAB-DU are further executable by the at least one processor to cause the apparatus to:
determine an identifier associated with at least one IAB-DU; and
represent the source IAB-donor CU as the at least one IAB-DU to the target IAB-donor-CU by adopting the identifier of the at least one IAB-DU for communications with the target IAB-donor-CU.

15. The apparatus of claim 13, wherein the instructions to configure the source IAB-donor CU to function as the first proxy for the at least one IAB-DU are further executable by the at least one processor to cause the apparatus to:
determine an identifier of an IAB-mobile terminal (IAB-MT) associated with the at least one IAB-DU; and transmit the identifier of the IAB-MT to the target IAB-donor CU in order to proxy for the at least one IAB-DU.

16. The apparatus of claim 13, wherein the state information associated with the at least one IAB-DU includes one or more of:
a configuration of a cell served by the at least one IAB-DU,
a context of a child connected to the at least one IAB-DU,
a transport layer information for a connection between the IAB-donor-CU and the at least one IAB-DU,
an identifier of a connection between the IAB-donor-CU and the at least one IAB-DU, or
an identifier of one or more of the at least one IAB-DU, the IAB-donor-CU or a child connected to the at least one IAB-DU used on a connection between the IAB-donor-CU and the at least one IAB-DU.

17. The apparatus of claim 13, wherein the state information associated with the at least one IAB-DU that is transmitted from the IAB-donor CU to the target IAB-donor comprises:
forwarding a configuration information of the at least one IAB-DU that is received from the at least one IAB-DU at the source IAB-donor CU.

18. The apparatus of claim 13, wherein the state information associated with the at least one IAB-DU that is transmitted from the IAB-donor CU to the target IAB-donor CU comprises:
forwarding a configuration information associated with the at least one IAB-DU to the target IAB-donor CU that the source IAB-donor CU had previously transmitted to the at least one IAB-DU.

19. The apparatus of claim 13, wherein the instructions to receive the state update information from the target IAB-donor CU are further executable by the at least one processor to cause the apparatus to:
receive, at the source IAB-CU, an updated base station-CU identifier from the target IAB-CU;
reconfigure, at the source IAB-CU, a cell identity (ID) for a cell served by the at least one IAB-DU based in part on the updated base station-CU identifier received from the target IAB-CU; and
generate the state update information associated based in part on the cell-ID.

20. The apparatus of claim 13, wherein the first signaling connection between the source IAB-donor-CU and the at least one IAB-DU is one of F1-connection (F1-C) or radio resource control (RRC) connection, and
wherein the second signaling connection between the source IAB-donor-CU and the target IAB-donor-CU is the F1-connection.

21. The apparatus of claim 13, wherein the at least one IAB-DU is one of an IAB-donor-DU or an IAB-node-DU.

22. The apparatus of claim 13, wherein the target IAB-donor CU and the at least one IAB-DU use one or both of the state information or the state update information in order to establish a transport network layer association (TNLA) directly between the target IAB-donor-CU and the at least one IAB-DU.

23. The apparatus of claim 13, wherein the source IAB-donor-CU indicates to the at least one IAB-DU a transport network layer (TNL) endpoint for the target IAB-donor-CU to enable the at least one IAB-DU to establish a transport network layer association (TNLA) TNLA between the target IAB-donor-CU and the at least one IAB-DU.

24. The apparatus of claim 13, wherein the IAB-donor-CU is a base station CU.

25. A non-transitory computer readable medium storing instructions, executable by a processor, for wireless communications, comprising instructions for:
establishing a first signaling connection between a source integrated access and backhaul (IAB) donor centralized unit (CU) of a base station with at least one IAB distributed unit (DU);
establishing a first signaling connection between a source integrated access and backhaul (IAB) donor centralized unit (CU) with at least one IAB distributed unit (DU);
establishing a second signaling connection between the source IAB-donor CU and a target IAB-donor CU;
configuring the source IAB-donor CU to function as a first proxy for the at least one IAB-DU in order to transmit state information associated with the at least one IAB-DU to the target IAB-donor CU;
receiving, at the source IAB-donor CU, a state update information from the target IAB-donor CU; and
configuring the source IAB-donor CU to function as a second proxy for the target IAB-donor CU in transmitting the state update information to the at least one IAB-DU, wherein configuring the source IAB-donor CU to function as the second proxy for the target IAB-donor CU further include instructions for:
determining an identifier associated with the target IAB-donor CU; and
representing the source IAB-donor CU as the target IAB-donor CU to the at least one IAB DU by adopting the identifier of the target IAB-donor CU for communications with the at least one IAB-DU.

26. The non-transitory computer readable medium of claim 25, wherein configuring the source IAB-donor CU to function as the first proxy for the at least one IAB-DU further include instructions for:
determining an identifier associated with at least one IAB-DU; and
representing the source IAB-donor CU as the at least one IAB-DU to the target IAB-donor-CU by adopting the identifier of the at least one IAB-DU for communications with the target IAB-donor-CU.

27. An apparatus for wireless communications, comprising:
means for establishing a first signaling connection between a source integrated access and backhaul (IAB) donor centralized unit (CU) with at least one IAB distributed unit (DU);
means for establishing a second signaling connection between the source IAB-donor CU and a target IAB-donor CU;
means for configuring the source IAB-donor CU to function as a first proxy for the at least one IAB-DU in order to transmit state information associated with the at least one IAB-DU to the target IAB-donor CU;
means for receiving, at the source IAB-donor CU, a state update information from the target IAB-donor CU; and
means for configuring the source IAB-donor CU to function as a second proxy for the target IAB-donor CU in transmitting the state update information to the at least one IAB-DU, wherein means for configuring the source IAB-donor CU to function as the second proxy for the target IAB-donor CU comprises:
means for determining an identifier associated with the target IAB-donor CU; and
means for representing the source IAB-donor CU as the target IAB-donor CU to the at least one IAB DU by adopting the identifier of the target IAB-donor CU for communications with the at least one IAB-DU.

* * * * *